(12) United States Patent
Ver Hage et al.

(10) Patent No.: US 7,387,049 B1
(45) Date of Patent: Jun. 17, 2008

(54) ANIMAL WATER FEEDING BOTTLE CAP HANDLING SYSTEM

(76) Inventors: Richard P. Ver Hage, 95 Oakdale Ct., North Haledon, NJ (US) 07508; Glenn Ver Hage, 39 Hill St., Midland Park, NJ (US) 07432

( * ) Notice: Subject to any disclaimer, the term of this patent is extended or adjusted under 35 U.S.C. 154(b) by 278 days.

(21) Appl. No.: 10/960,412

(22) Filed: Oct. 6, 2004

Related U.S. Application Data

(60) Provisional application No. 60/509,792, filed on Oct. 9, 2003.

(51) Int. Cl.
*B67B 3/20* (2006.01)
*B67B 7/18* (2006.01)

(52) U.S. Cl. .............................. 81/3.4; 81/3.2; 81/120; 81/124.2; 81/57.4; 53/490

(58) Field of Classification Search ................... 81/3.4, 81/3.2, 3.25, 3.31, 3.32, 3.33, 120, 121.1, 81/124.2, 57.4, 57.24; 53/317–318, 381.4, 53/331.5, 287, 490
See application file for complete search history.

(56) References Cited

U.S. PATENT DOCUMENTS

| | | | | | |
|---|---|---|---|---|---|
| 2,097,022 | A | * | 10/1937 | Donahue | 53/490 |
| 4,171,650 | A | * | 10/1979 | Cardinal | 81/3.2 |
| 4,749,251 | A | * | 6/1988 | Moulin | 385/78 |
| 4,817,475 | A | * | 4/1989 | Kelly et al. | 81/121.1 |
| 5,165,310 | A | * | 11/1992 | Heinrich | 81/120 |
| 5,353,666 | A | * | 10/1994 | Rogers | 81/124.4 |
| 5,544,554 | A | * | 8/1996 | Brightly | 81/57.4 |
| 6,105,468 | A | * | 8/2000 | Fohrman et al. | 81/3.09 |
| 6,691,592 | B2 | * | 2/2004 | Hahn | 81/3.2 |
| 2004/0194585 | A1 | * | 10/2004 | Clark | 81/124.2 |

* cited by examiner

*Primary Examiner*—D. S Meislin
(74) *Attorney, Agent, or Firm*—W. Patrick Quast

(57) ABSTRACT

An economical system and method for eliminating manual operations in smaller scale animal feeding water bottle management is provided. A hand held cap removal tool captures the perimeter of the water bottle cap for automatic capping or decapping. Provisions for suspending the tool for convenient universal motion over a work area are described. The cap removal tool accommodates straight and angled water delivery tubes and most popular water bottle cap sizes.

14 Claims, 13 Drawing Sheets

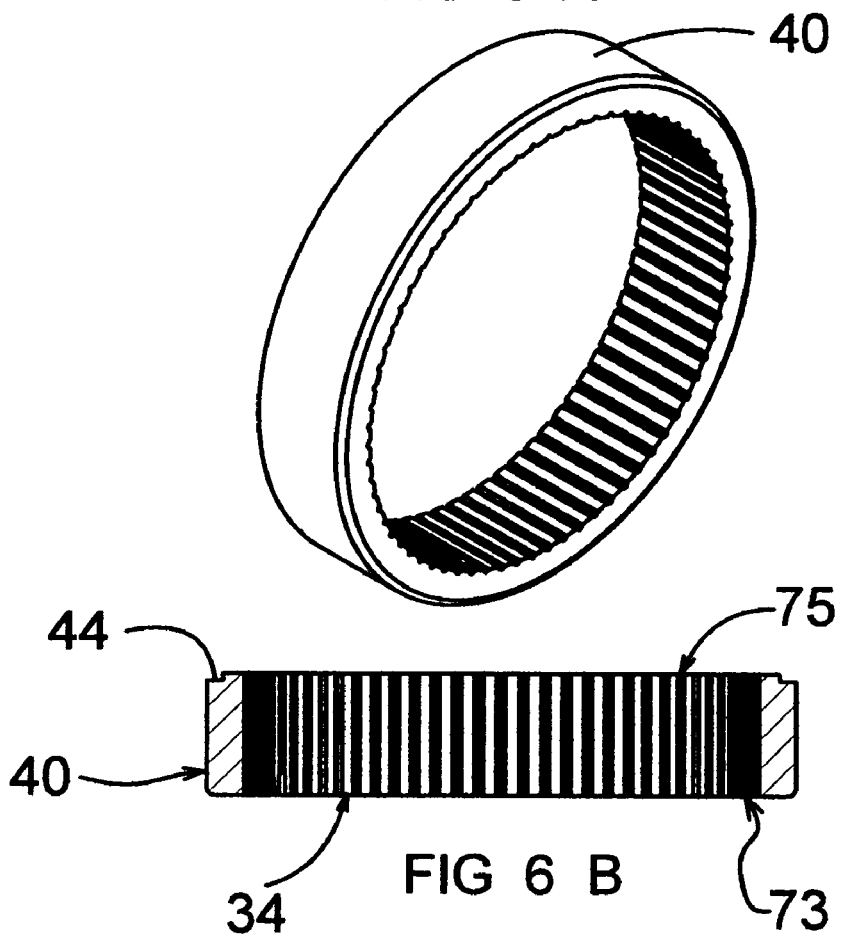
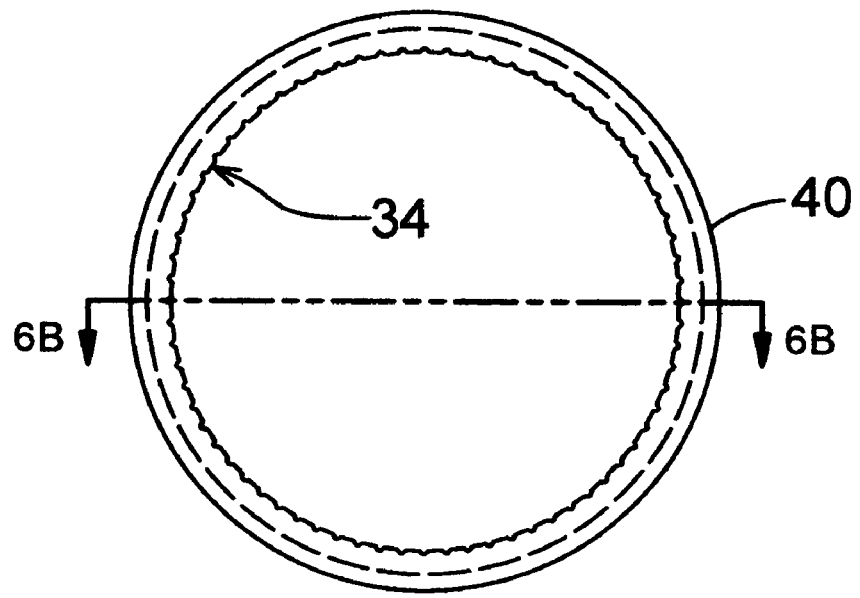

FIG 6 D
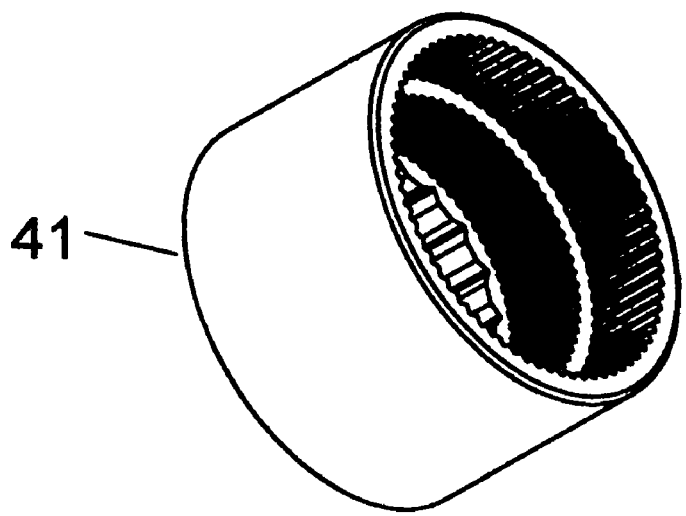
FIG 6 E
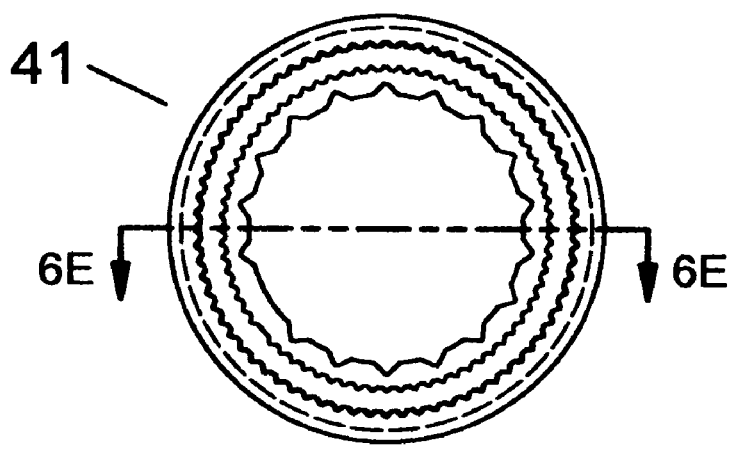
FIG 6 F

ANIMAL WATER FEEDING BOTTLE CAP HANDLING SYSTEM

This application claims the benefit of U.S. Provisional Application No. 60/509,792, filed Oct. 9, 2003. This invention relates to bottle cap handling systems, and in particular to devices and methods for installing and removing caps from animal water feeding bottles.

BACKGROUND

Medical research depends on animal experimentation which demands large numbers of animals, such as mice, rats, guinea pigs, and so on. Depending on the nature of the project animals may be housed singly or in multiples in each cage. In either case, a container for water is usually essential for each cage. In the past and to some extent even today this problem was addressed by providing a rubber stopper with a through hole, inserting a specially designed stainless steel tube in the hole, and inserting the rubber stopper into a suitable glass or plastic water bottle. Obvious problems with reliability and labor considerations led to the growing use of metal or plastic screw caps to replace the rubber stoppers, and matching threaded neck water bottles. While this provided reliable animal watering devices the lab technician was still faced with dealing with perhaps thousands of bottles each day. Each bottle cap has to be unscrewed to remove the cap, the bottle emptied of remaining water, filled with fresh water, and finally the cap resecured. This tedious work is not only boring and costly, but can lead to physical injury such as carpal tunnel syndrome. It has been estimated that repetitive motion of this kind can lead to worker complaints costing up to $15,000 per complaint in terms of lost productivity, disability, and medical costs.

To address this tedious problem of uncapping, dumping, and recapping bottles a variety of automated animal water bottle handling systems have been devised, including mechanical and computer programmed. These systems are currently commercially available for large scale animal requirements. However, for smaller research requirements the problem persists. The present invention provides a solution by providing a simple, economical hand held water bottle decapping and recapping system specifically for those applications still depending on objectionable manual operations.

It is therefore a primary object of the present invention to provide a system for capping and decapping bottles with a hand held mechanism.

An additional object of the present invention is to fill the gap between automatic and manual bottle capping and decapping procedures.

A further object of the invention is to speed up the installation and removal of caps on water bottles.

Still another object of the invention is to minimize or eliminate physical injury to workers, such as carpal tunnel syndrome.

Yet another object of the invention is to provide a consistent and predetermined torque of each cap so as to minimize leakage.

SUMMARY

These and other objects are obtained with the animal water cap handling system of the present invention.

As noted above the task of unscrewing water bottles, emptying their contents, refilling the bottles, and then resecuring the threaded cap onto the matching bottle threads is an extremely objectionable procedure. It occurred that a hand held tool could be constructed to substantially eliminate the problem for those facilities wherein economic considerations dictated manual procedures. To this end a tool has been devised to automatically remove and resecure a cap on a water bottle.

Basically the cap handling tool is comprised of a straight tube having a gripper head at one end, and a drive tool mating piece at its other end. The gripper head is comprised of an upper section (for example, a cone shaped section) affixed to a perpendicularly attached gripper ring. An aperture at the center of the upper section, such as at the apex of the cone, permits attaching the gripper head to one end of the tube. The internal surface of the gripper ring is serrated with the serrations running parallel to the tube. The other end of the tube retains the drive tool mating piece. This extends a spaced distance away from the tube and is axially aligned with the center line of the tube.

Animal water feeding bottles tend to be standardized in their thread configurations as set by the Society of Plastics Industry. Typical cap sizes used with feeding bottles are 48 mm, 40 mm, and 54 mm, with the 48 and 40 mm sizes comprising about 90% of these bottle types in use.

To use the cap handling tool of the present invention, the drive tool mating piece on one end of the handling tool, typically hexagonal in shape, is inserted into the hexagonal clutch of a standard electric screw driver, as, for example, Dewalt model # DW 920K2. As will be more fully described below the gripper ring, which is sized to have a diameter slightly larger than the cap to be removed and with serrations substantially matching similar serrations on the side of the cap, is then positioned on the cap, the electric screw driver is activated so as to rotate the tool counterclockwise, thereby removing the cap. The process can be reversed, i.e. resecuring the cap, by having the electric screw driver rotate the tool clockwise. Preferably, the serrations on the interior of the gripper ring are tapered to be slightly larger at its lower opening so as to facilitate grasping the serrations on the side of the cap.

It is important to note that the purpose of the tube portion of the cap handling tool is to accommodate the metal, glass, or plastic water dispensing tube inevitably extending through the cap. These water tubes are generally of two types, a first straight type, of varying height, extending perpendicular to the top surface of the cap, and a second type, of varying height, extending at a right or acute angle to the cap top surface. In this latter case a second version of the cap handling tool has been devised having a slot in the gripper head and a matching, aligned slot in the tube so as to permit the gripper head to be secured over the water tube and onto the cap for the decapping-recapping procedures. In the case of the perpendicular water tube a slot for the gripper head and tube is not required, the water tube simply being inserted into the hollow tube section of the cap handling tool.

In addition to having a gripper head assembly for either perpendicular or angled water tubes, and to accommodate the differently sized serrated caps, a universal gripper head can be provided for those applications requiring frequently processing differently sized bottle caps. In one case the gripper head is configured to have all three popular thread sizes incorporated, one above the other in a single gripper head. Other combinations with two or more than three can be fashioned to accommodate a broader selection of caps if desirable.

While the above described hand held cap handling system provides a substantial improvement, the system is further improved by adding means for suspending the electric screw driver and attached cap handling tool in a universally positioning mode over the work area containing the bottles. A series of descriptions illustrating possible versions will be fully discussed below. For example, a bottle filling apparatus can be adapted in order to have a vertical arm connected to a rotatable horizontal arm so as to position a cable connected driver-tool combination over the racks containing the bottles and caps to be processed. Alternatively, a rotatable horizontal arm can be wall mounted with a cable connected driver-tool combination universally positionable over a work area. Still another alternative would be to suspend a universally positionable cable connected driver-tool combination from a ceiling over a work area.

It should be noted that a variety of other drive mechanisms can be used for cap handling tool rotation. For example, a flexible shaft assembly available from S.S. White Technologies, Inc., of Piscataway, N.J., can be employed. One possible arrangement would be to wall mount a rotatable horizontal arm having a ring support through which the flexible shaft can be positioned and secured. One end of the shaft would connect to the cap handling tool, while the other end of the flexible shaft would connect to a variable power, foot switch operated motor. Other drive mechanisms for the cap handling tool would include standard drill and drill bit clutch combinations, threaded connections to a drive mechanism, screw on securing mechanisms for securing the cap removal tool to the drive mechanism, and so on depending on designer preference.

While the above noted examples employ electric driven devices, obviously other power means, including air pressure, can be employed as the means for rotating the cap handling tool. The tool itself can be fabricated in metal such as steel or aluminum, or plastics such as polycarbonate. Stainless steel is preferred for its ability to withstand sterilization, and acceptability in sensitive pharmaceutical environments. In the case of plastics, Food and Drug Administration approved materials may be an important consideration.

BRIEF DESCRIPTION OF THE DRAWINGS

FIG. 6A is a side, elevational perspective view of the gripper ring section of the gripper head of FIG. 5A.

FIG. 6B is a sectional, schematic view of the gripper ring of FIG. 6A, taken along the line 6B-6B of FIG. 6C.

FIG. 6C is a bottom plan, schematic view of the gripper ring of FIG. 6A.

FIG. 6D is a perspective view of a multi-cap gripper ring employing the principles of the present invention.

FIG. 6E is a sectional, schematic view of the gripper ring of FIG. 6D, taken along the line 6E-6E of FIG. 6F.

FIG. 6F is a bottom plan, schematic view of the gripper ring of FIG. 6D.

DETAILED DESCRIPTION

Figure 1:
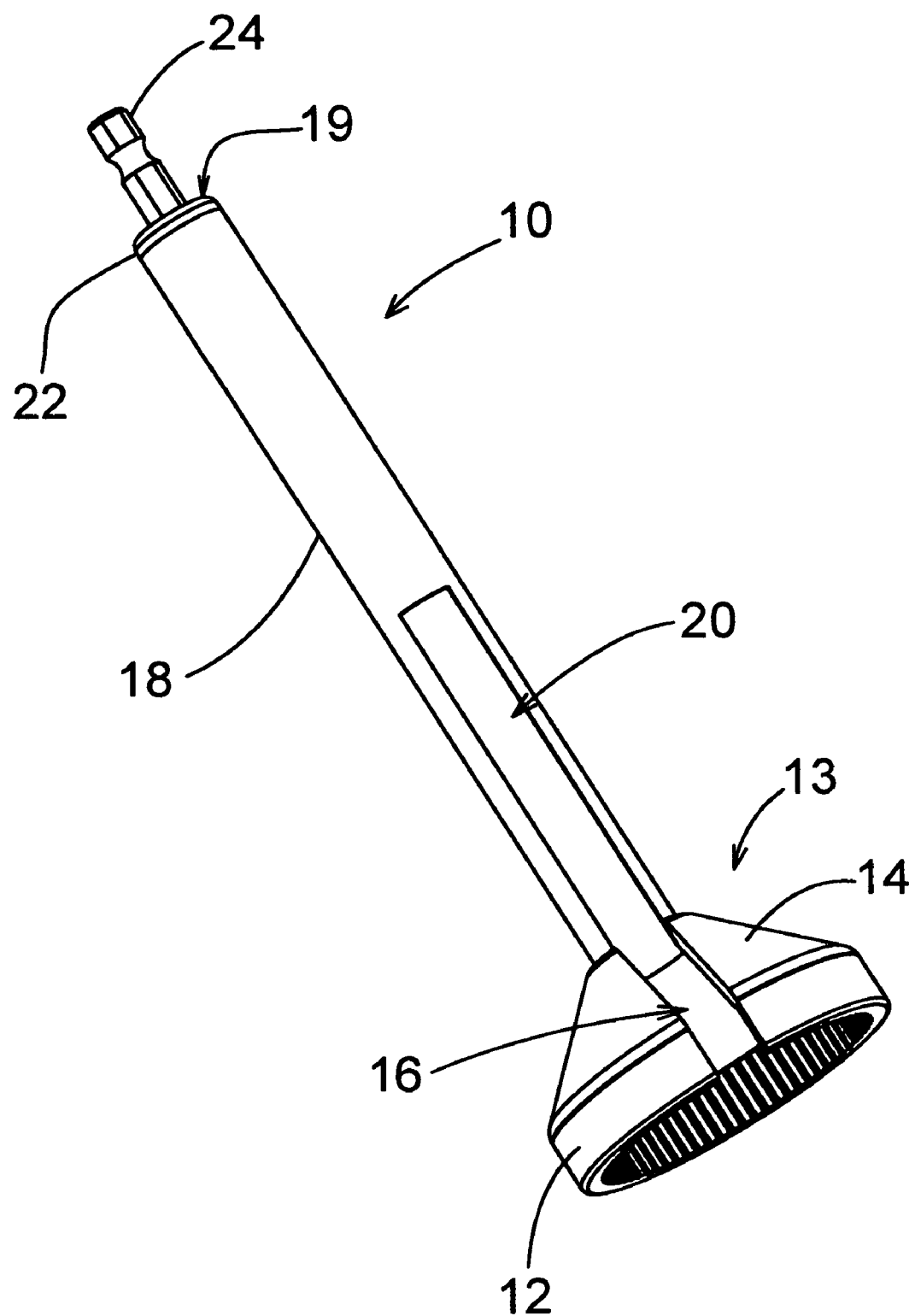
FIG. 1 is a perspective view of one version of the cap handling tool of the invention, showing a slot in the gripper head and attached tube for accommodating angled water tubes.

Turning now to the drawings wherein similar structures having the same function are denoted with the same numerals, in FIG. 1a version of the cap handling tool 10 of the invention is depicted. The cap handling tool 10 is basically comprised of a straight, hollow tube 18 having a gripper head 13 affixed at one end, and a plug 19 (FIG. 2B) inserted and secured at its other end typically by welding to the top of the tube 18. A drive tool mating piece, here a hex bar 23 (FIG. 2A), is tightly inserted into, pinned or welded to, a complementing opening in plug 19 to complete the structure of the cap handling tool 10. Dimensions can be approximately 6" in length×¾" dia. for the tube; 2.5" dia.×1¼' in length for the gripper head, and 1½" in length×¼" across the flats for the hex bar 23. Stainless steel is a preferred material of construction due to the fact that it can be sterilized, is durable, and acceptable in sensitive animal research areas, but a variety of other metals, such as aluminum, can also be used. The tool can, of course, be fabricated in plastics such as polycarbonate, with care given to Food and Drug Administration approved materials if necessary.

Figure 2:
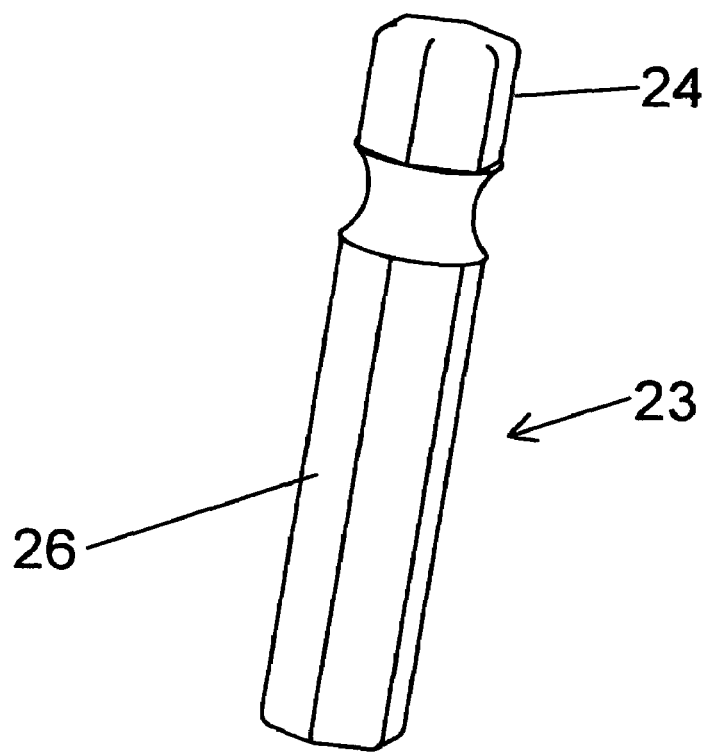
FIG. 2A is a perspective view of a hex bar drive-tool connector.
FIG. 2B is a perspective view of a hex plug for the hex bar of FIG. 2A.
FIG. 2C is a perspective view of the tube section of one version of the cap handling tool of the invention, illustrating a slot for accommodating angled water tubes.
Figure 2:
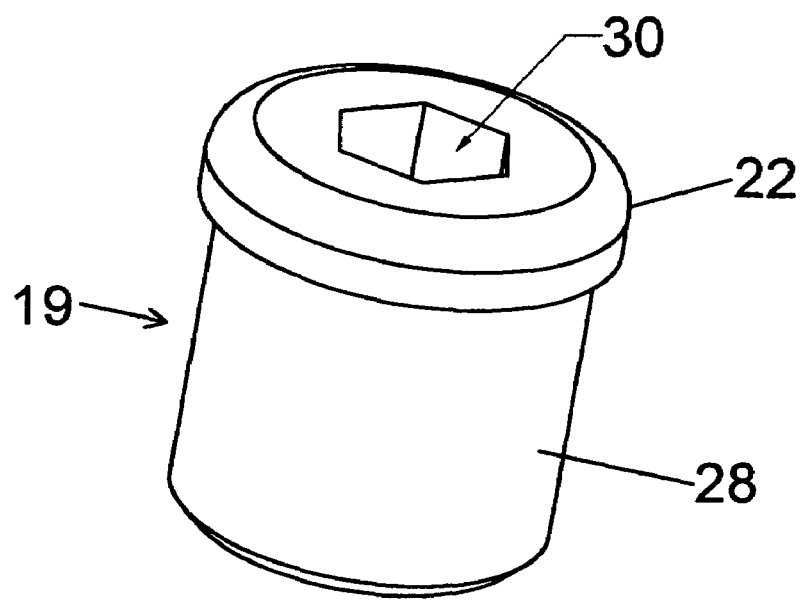
Figure 2:
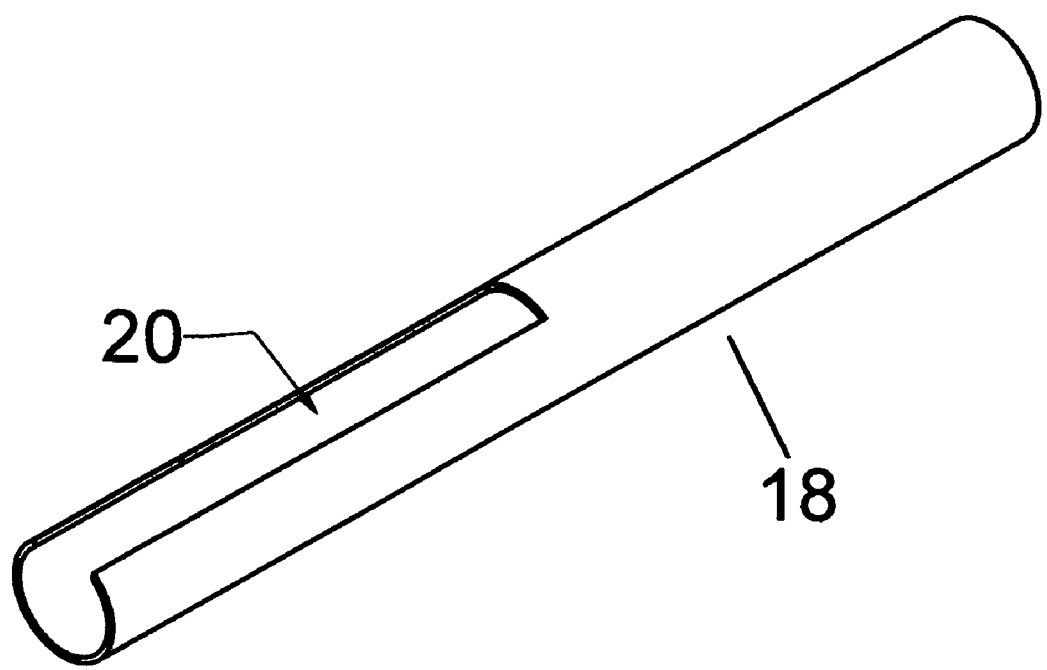

As seen in FIGS. 2A and 2B, the hex plug 19 has a shaft 28 for insertion and for press fit or weld connection into the top of tube 18, with an annular, larger diameter collar 22 substantially matching the outside diameter of the tube. Opening 30 in the hex plug accepts the hex shaft 26 of the hex bar 23 protruding above the end of the tube 18 when inserted.

Figure 3:
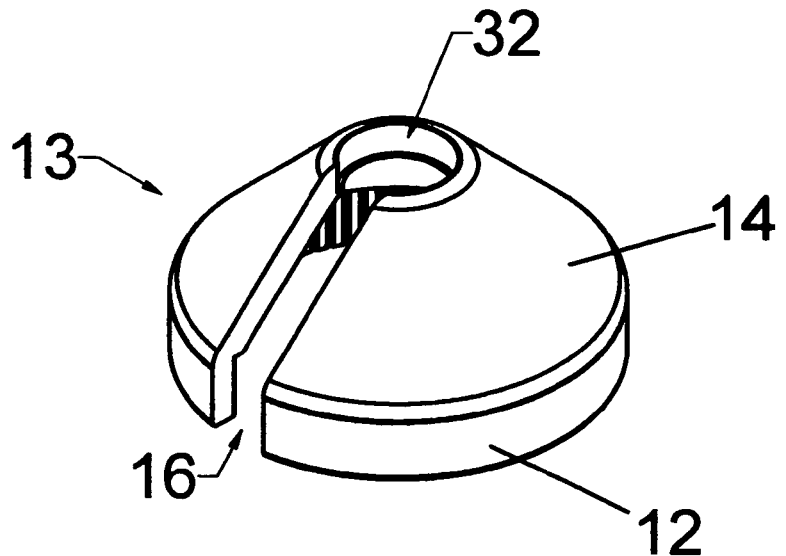
FIG. 3A is a perspective view of a gripper head illustrating a slot for accommodating angled water tubes.
FIG. 3B is a side, schematic sectional view of the gripper head of FIG. 3A.
FIG. 3C is a side, schematic view of a portion of the gripper head taken along the lines 3C-3D of FIG. 3B showing an O ring within an annular groove acting as a bottle cap spacer.
FIG. 3D is a side, schematic view of a portion of the gripper head taken along the lines 3C-3D of FIG. 3B showing an O ring within an annular groove acting as a gripper for a bottle cap.
Figure 3:
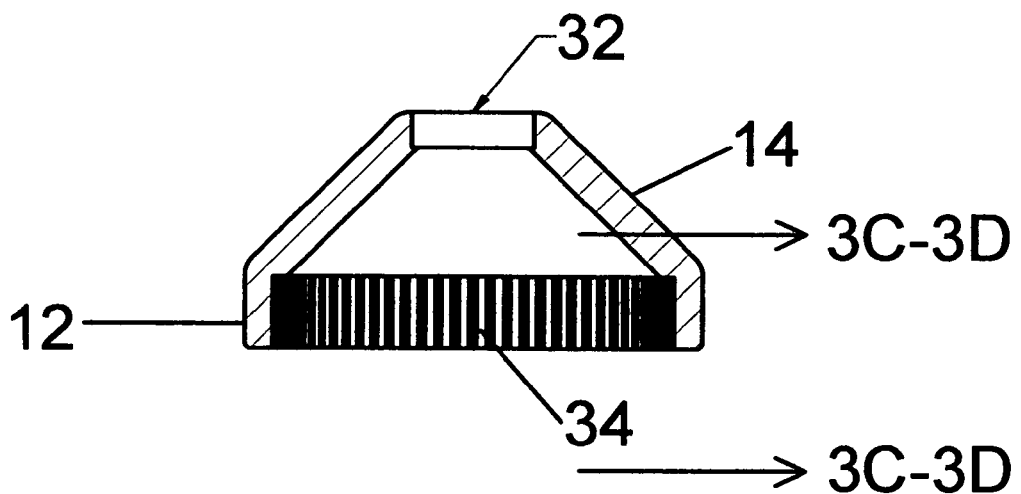
Figure 3:
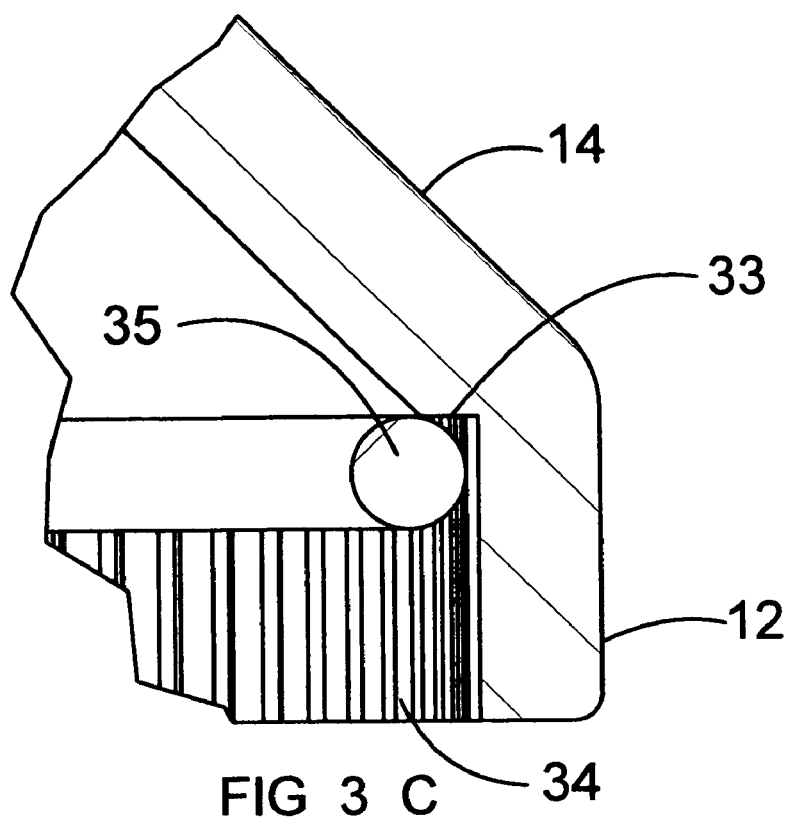
Figure 3:
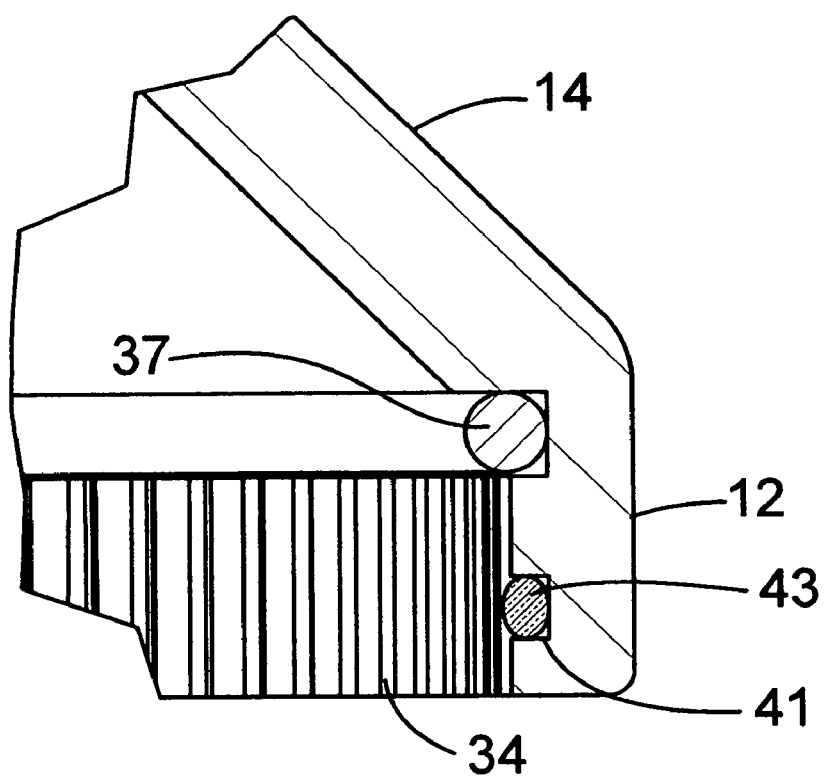
Figure 4:
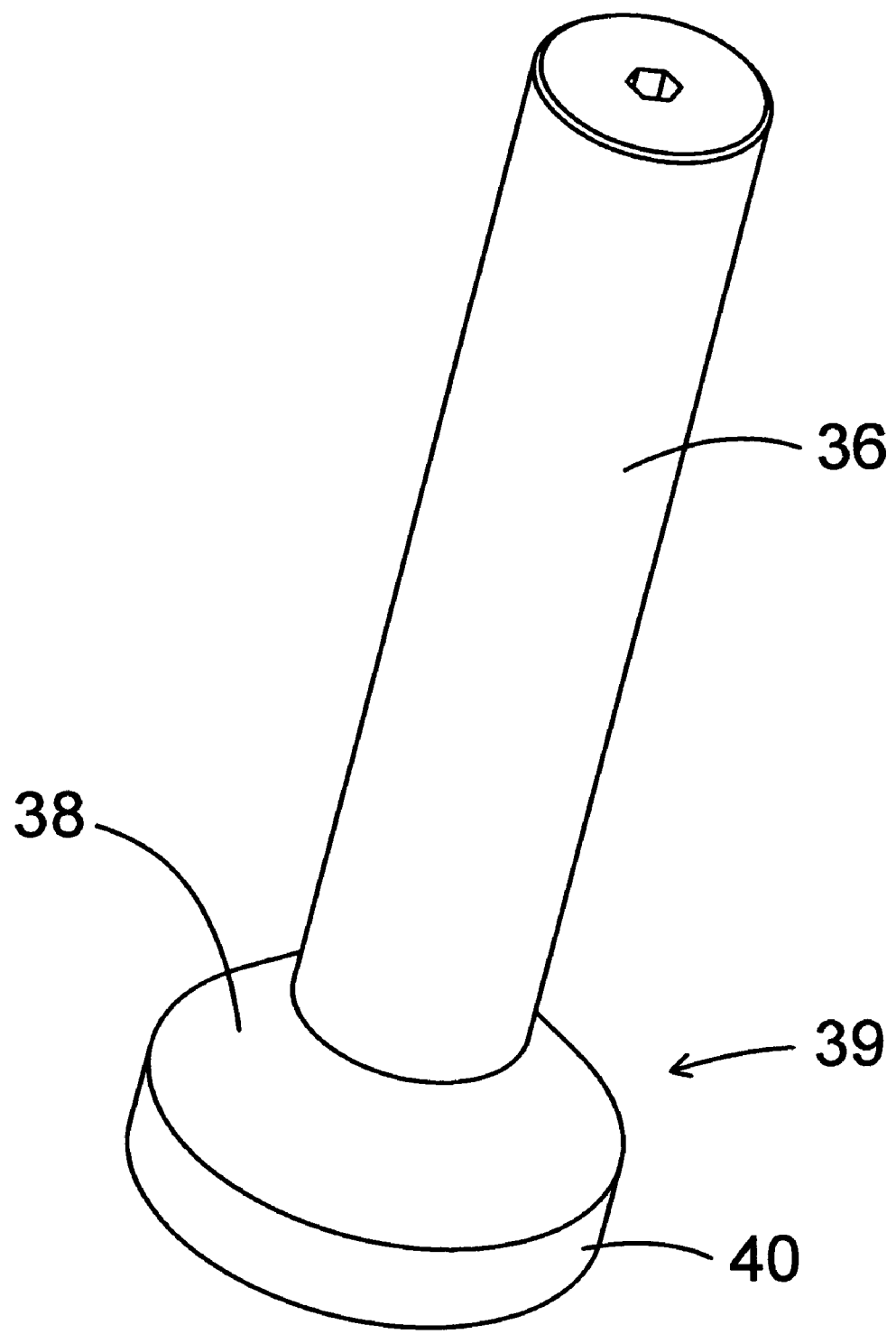
FIG. 4 is a perspective view of a non-slotted tube and gripper head for one version of the cap handling tool of the invention.
Figure 5:
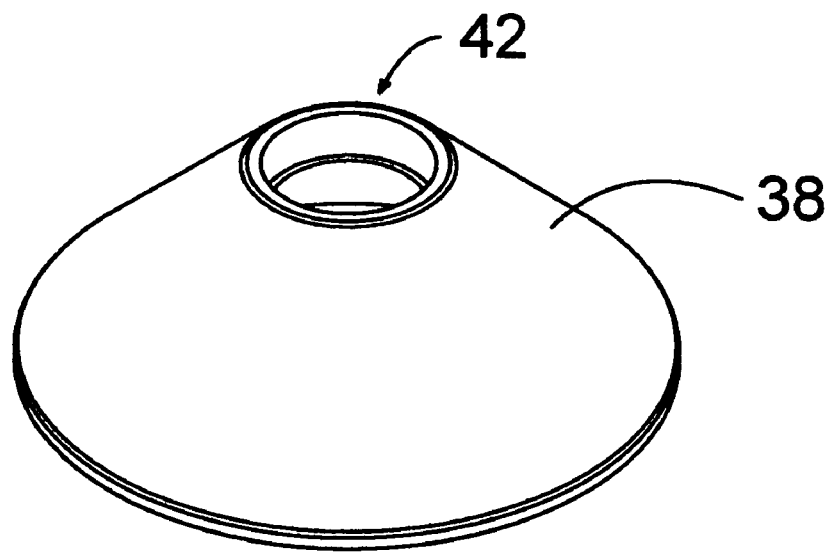
FIG. 5A is a perspective view of one embodiment of the upper section of the gripper head of FIG. 4 depicted as conical in shape.
FIG. 5B is a side, sectional, elevation view of the cone portion in FIG. 5A.
Figure 5:
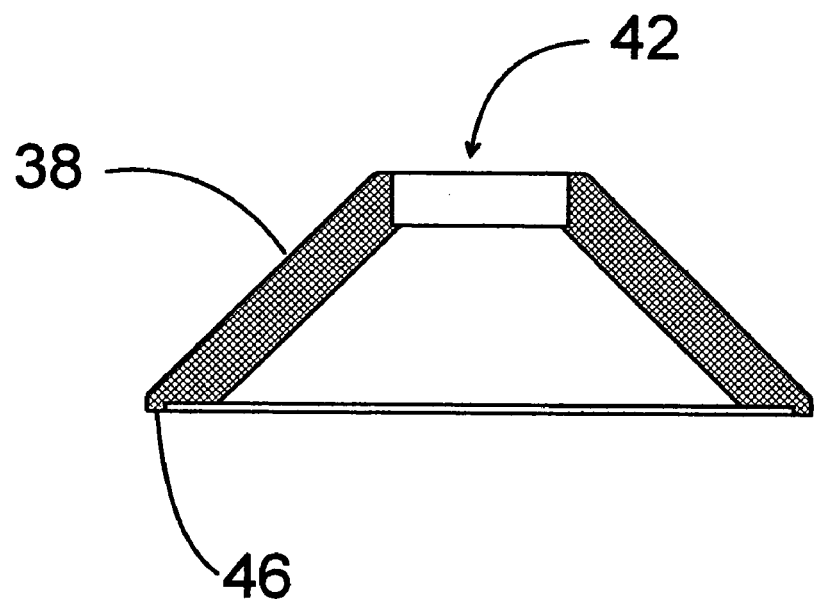

As illustrated, one embodiment of the gripper head 13 is comprised of a cone shaped top portion 14 (FIG. 3A) having an aperture 32 at the apex of the cone, the cone 14 being fixedly secured to an annular gripper ring 12 affixed to the outer periphery of the cone (FIG. 3A). In FIGS. 5A and 5B, cone portion 38 of the slot-less embodiment of the gripper head 39 (see FIG. 4) is depicted. The annular ring 40 of gripper head 39 is best illustrated in FIGS. 6A, 6B and 6C. As seen in FIGS. 5B and 6B a right angle annular cut out 44 adjacent the peripheral edge of the gripper ring 40 complements an extended perimeter, annular protrusion 46 at the peripheral edge of the cone 38 for a secure point of attachment. This complementing structure exists also between gripper ring 12 and cone shaped top portion 14 for the slotted version. A preferred method for joining the cone 14 and the gripper ring 12, and similarly the cone 38 and the gripper ring 40, is by welding. The tube 18 (or tube 36, see FIG. 4) can be press fitted or welded to the aperture 32 (or 42) in the cone 14 (or 38).

Figure 7:
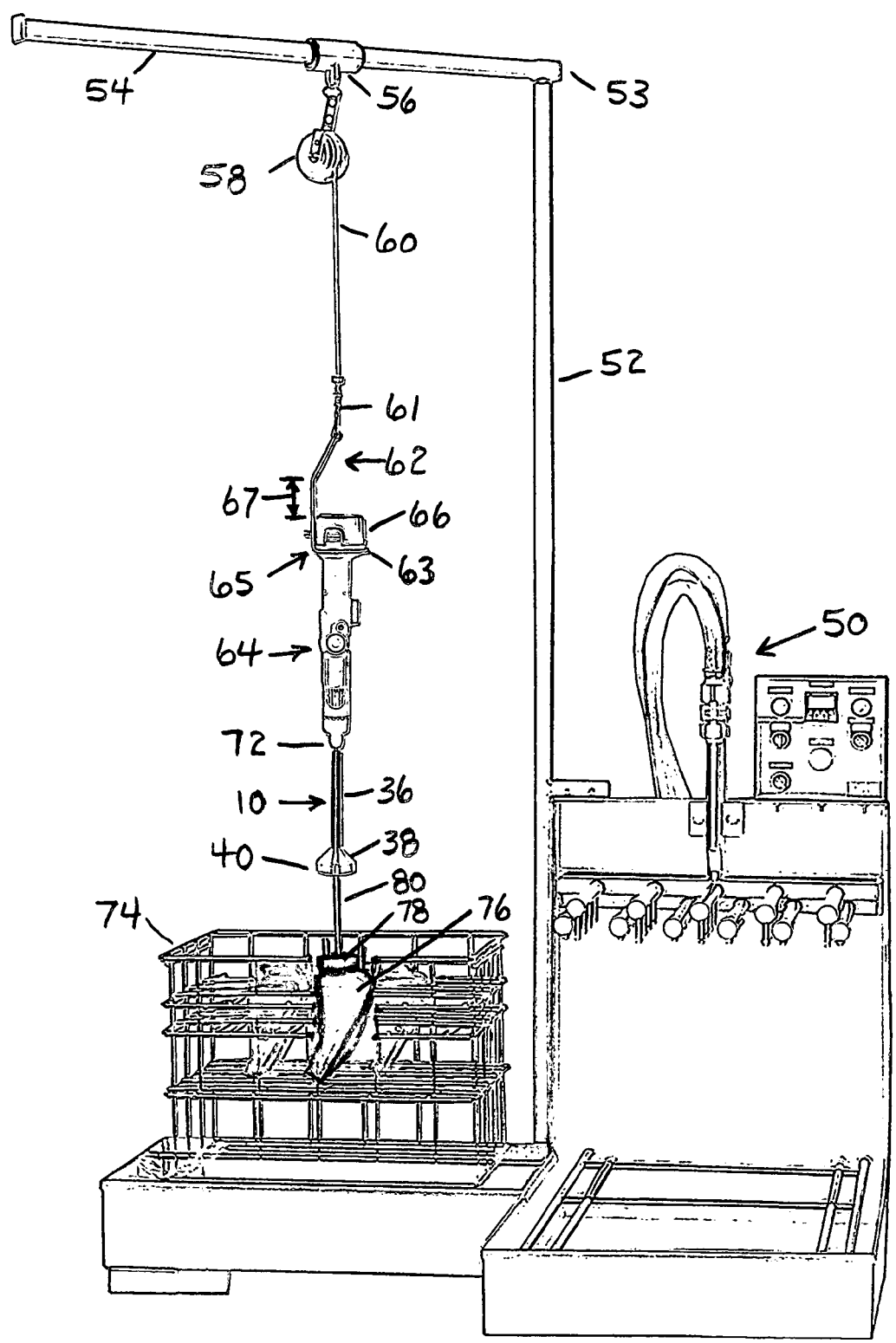
FIG. 7 is a perspective view of one version of the cap handling system of the invention shown suspended in position above a container of bottles and adjacent a bottle filling apparatus.

FIGS. 3B, 6A, 6B, and 6C illustrate the gripper ring mechanism used to facilitate cap removal. The interior surface of the gripper head has annularly disposed serrations 34 running generally parallel to the direction of the tube. The purpose of the serrations is to contact matching serrations on the outer surface of the bottle cap 78 (FIG. 7). For example, the grooves forming the serrations might be 5° apart, therefore comprising 72 grooves around a cap or ring circumference. As perhaps best seen in FIG. 6B the ring diameter of the gripper ring 40 is slightly larger at the lower end 73 of the gripper ring 40 as contrasted to the upper end 75. This allows the operator to more easily engage the bottle cap, for example 78, for removal. Once the ring envelops the cap, the operator urges the tool further onto the cap to the point where the upper end 75 of the ring engages the cap. At this point, the cap can be rotatably removed from or refitted to the bottle.

FIGS. 3C and 3D illustrate the use of O rings (35,37,41) to further facilitate the handling of bottle caps within the gripper head. An annular groove 33 has been formed adjacent the point of attachment of the gripper head upper section 14 and the gripper ring so as to permit the placement therein of O rings of differing diameters. It is sometimes desirable to prevent the gripper ring from temporarily grasping a bottle cap during cap removal procedures. For example, in FIG. 3C an O ring 35 having substantially the same diameter as the diameter of the bottle cap is shown. When the upper end 75 of the gripper ring engages the cap this O ring 35 prevents temporary grasping of the cap by the gripper ring, thereby acting as a spacer between the cap top surface and the upper end 75 of the gripper ring, thereby facilitating removal of the cap from the gripper ring FIG. 3D illustrates the use of O rings to enable the gripper head to temporarily grasp the bottle cap for those applications where the operator prefers to place the cap in the gripper ring portion of the tool before installing the cap in a bottle. In one approach an O ring 37 having a slightly smaller I.D. than the O.D of the bottle cap would be secured the annular groove 33 between the gripper head upper section and the gripper ring. When an operator urges the tool further onto the cap the O ring 37 will be slightly deformed between the top surface and immediate top sides of the cap, causing the cap to be temporarily grasped by the gripper head. Alternatively, an annular groove 41 can be placed a spaced distance along the interior wall of the gripper ring to permit the placement therein of an O ring 43 having an I.D. slightly smaller so as to fit over the sides of the bottle cap. Placing the gripper ring over the bottle cap will now cause an external surface of the bottle cap to contact the O ring 43, thereby causing the gripper head to temporarily grasp the bottle cap. Installation of the cap to the bottle would then follow.

FIGS. 1, 2C, and 3A illustrate an important feature of one version of the cap removal tool 10 of the invention. For those applications wherein the water dispensing tube is at a right or acute angle as it exits the bottle cap, and of varying height, a slot 16 is provided in the cone 14 and gripper ring 12 (FIG. 3A), and a slot 20 is provided in tube 18. The slot 20 has sufficient length to accommodate the longest angled tube to be expected in a particular application.

For those applications depicted in FIG. 7 wherein the water dispensing tube 80 is straight and perpendicular to the top surface of the cap there is, of course, no need for a slotted tool. In FIG. 4 a non-slotted tube 36 is depicted, affixed to a gripper head 39 comprised of a non-slotted cone 38 (FIGS. 5A and 5B) and a non-slotted gripper ring 40 via aperture 42.

In addition to a slotted gripping ring 12 and a non-slotted gripping ring 40 available in sizes and serrations to match the differently sized and differently serrated bottle caps, FIGS. 6D, 6E, and 6F, illustrate a single gripper ring 41 for accommodating all three standard bottle cap threads. Gripper ring 41 can, of course, be made available in a slotted configuration. A variety of other gripper rings configured to engage other bottle cap profiles can also be employed for the cap removal tool 10 of the invention. For example, a gripper ring for a hexagonally sided bottle cap is easily provided consistent with the principles of the invention.

FIGS. 7-10 illustrate a number of different systems and methods for convenient use of the cap removal tool. In FIG. 7 the tool is shown used in conjunction with a bottle filling apparatus, which is described in U.S. patent application Ser. No. 10/266,796, filed Oct. 8, 2002, the disclosure of which is hereby incorporated by reference. The bottle filling machine 50 is shown with a vertical member 52 connected via a bushing 53 to horizontal member 54. This bushing arrangement allows rotational movement about vertical member 52. A bushing 56 mounted on the horizontal member permits lateral movement of a spring loaded tool balancer mechanism 58 with connected cable 60 along the length of horizontal member 54. A suitable tool balancer mechanism is available as part # 62410005 from the Hubbell Company of Mayville, Wis. Clip 61 connects cable 60 to a tool support bracket 62. Bracket 62 includes a looped end 63 configure to firmly engage the butt end 65 of the tool driving mechanism 64, which in this embodiment is a standard electric screw driver such as Dewalt's Model # DW 920K2. As is standard with such devices, a battery pack, 66 is secured to the butt end of the 64. Bracket 62 is designed to provide a clearance height distance 67, which enables the removal and/or replacement of the battery pack 66 without necessarily removing the tool driving mechanism 64 from the bracket 62. Chuck 72 at the end of the electric screw driver is shown secured to the head 24 of the hex bar 23 at the top of the cap removal tool 10. The tool is shown suspended just above a typical animal feeding water bottle 76, with cap 78 having a perpendicular water dispensing tube 80 in place. The water bottle is shown positioned in a container 74 typically having a plurality of such bottles placed therein prior or subsequent to being processed by the bottle filling apparatus 50. In this arrangement the cap removal tool is free to move in all directions, up and down, as facilitated by the spring loaded tool balancer mechanism 58, and side to side or front to back because of the lateral or rotational connections between members 52, 54 and 56. This enables access to the bottles at every location in the bottle container or bottle containers placed side by side, if the dimensions accommodate such a juxtaposition. In operation, with the tool 10 connected to the driving mechanism 64, the operator grasps the mechanism 64 to lower the tool including the gripper on to a respective bottle cap. If the bottle cap includes an angled tube, of course the slotted version of the tool (see FIG. 1) will be employed. In the latter case, the operator would have to align the slot in the gripper 13 and tube 18 with the orientation of the water tube as it emanated from the cap 78. As noted above the engagement of the cap is facilitated due to the relatively larger opening of the lower portion of the gripper ring, for example 12. The cap is engaged and the operator urges the tool further downward until the gripper ring firmly grasps the cap. At this point the tool driving mechanism is energized in a known manner to allow appropriate rotational motion depending on whether the cap is to be removed or secured. A tool driving mechanism 64 is selected which enables the operator to adjust the torque and/or speed applied through the tool to the bottle cap. The Dewalt device noted, for example, has an adjustment capability over a range of "1 to 20" which allows the operator to experiment with and empirically determine the desired torque to sufficiently tighten the cap to prevent or minimize leakage without stripping or otherwise mutilating the internal cap threads.

Figure 8:
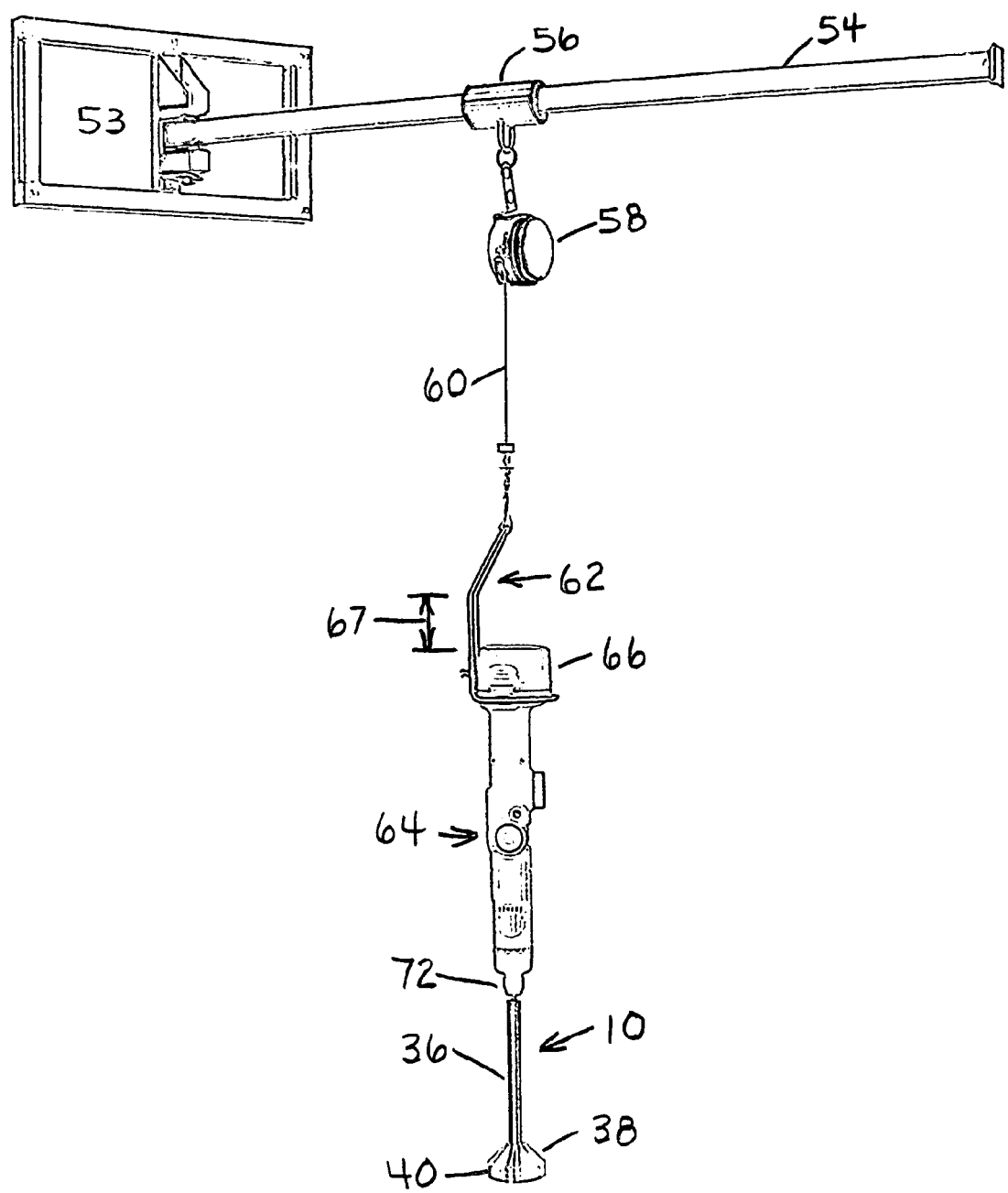
FIG. 8 is a view similar to FIG. 7 illustrating a wall mounted suspension of one version of the cap handling system of the invention.

FIG. 8 illustrates a similar arrangement to that of FIG. 7 except in this case the horizontal member 54 is rotationally connected to a wall 53. Once again the cap removal tool is free to be positioned in virtually any direction as required.

Figure 9:
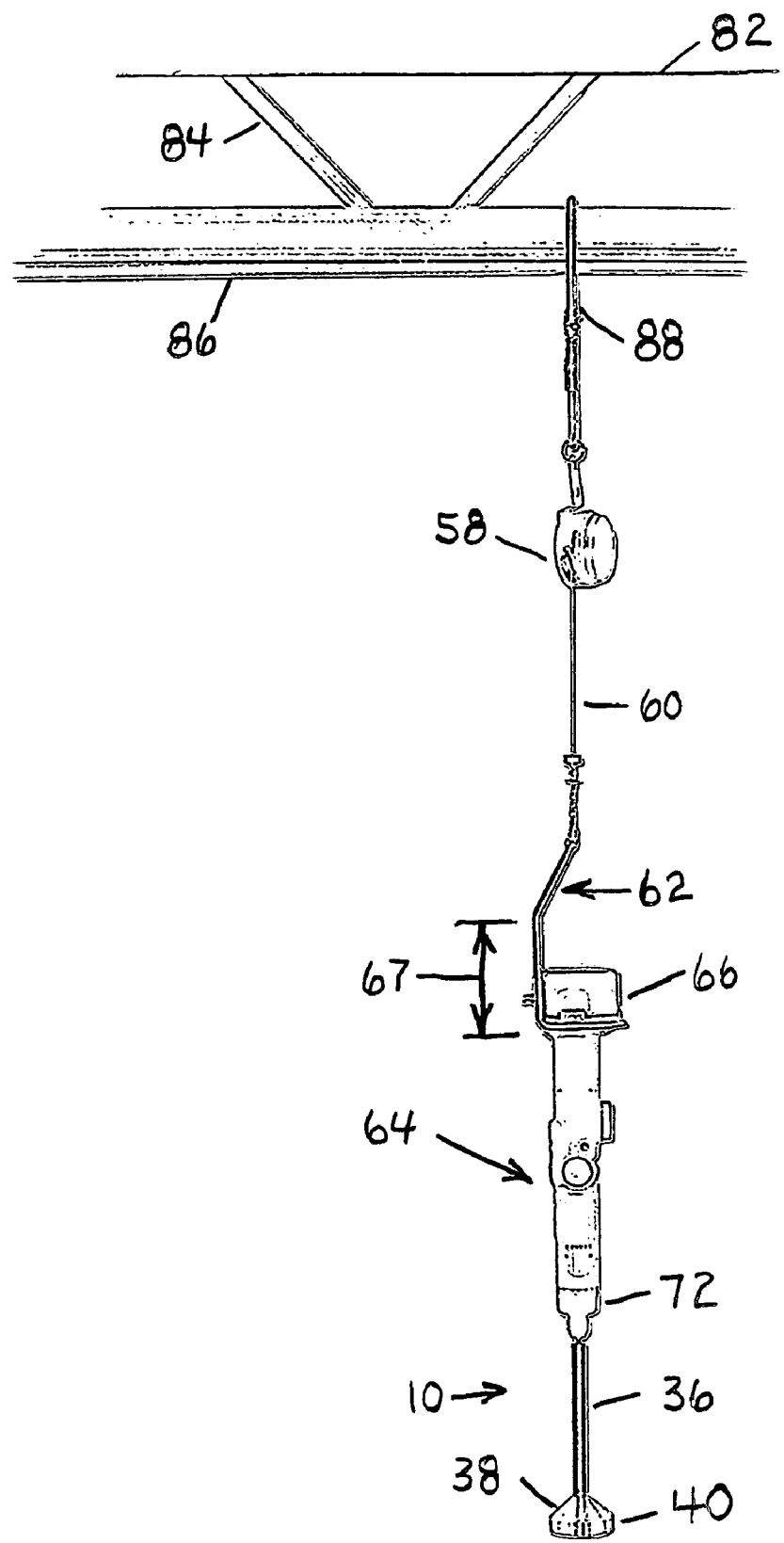
FIG. 9 is a view similar to FIG. 8 illustrating a ceiling mounted suspension of one version of the cap handling system of the invention.
Figure 10:
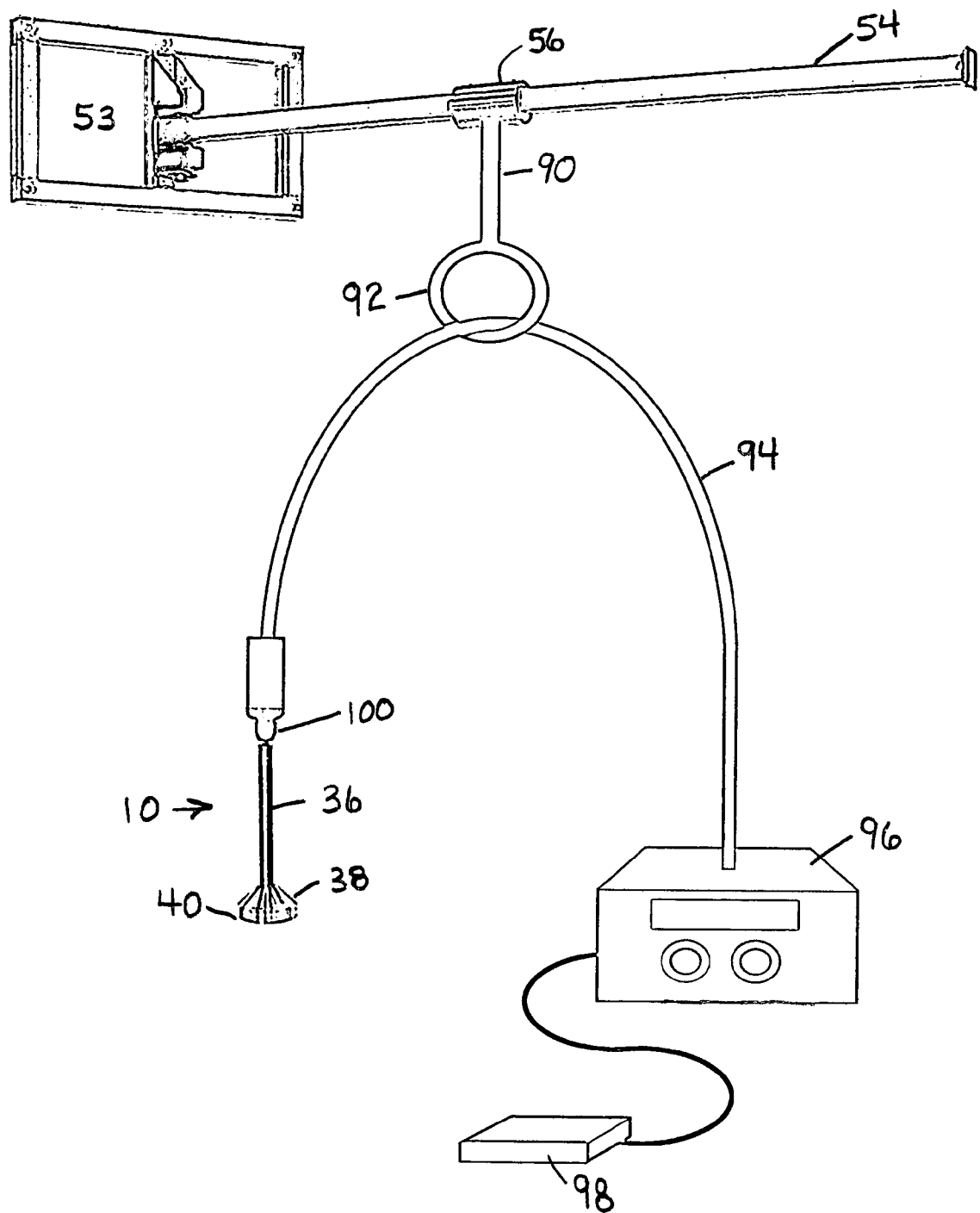
FIG. 10 is a perspective view of one version of the cap handling system of the invention, illustrating a foot activated, motor driven flexible shaft as the controlled source of rotation for one version of the cap handling tool of the invention.

Again in FIG. 9 a similar arrangement to that of FIGS. 7 and 8 is shown. In this case the cap removal tool is illustrated as being rotationally suspended from a ceiling 82. Support bars 84 extend from the ceiling affixed to a horizontal bar 86 which provides the laterally adjustable support 88 for the remainder of the suspension assembly.

Obviously, in addition to the above described electric screw driver, a variety of other rotary drive devices can be similarly employed to rotate the cap removal tool. For example, in FIG. 10 a flexible shaft, available from S.S. White Technologies, Inc. can be utilized. Again a wall mounted horizontal member 54 supports a lateral movement bushing 56 securing a bar 90 and loop 92 for positioning and securing the flexible shaft 94. The flexible shaft can be equipped at one end with a hex chuck 100 for securing the head 24 of the hex bar 23 on the tool 10 thereto. The other end of the flexible shaft is connected to a controllable source of power 96, such as an electric motor, and a foot operated on/off switch 98, for providing clockwise or counterclockwise rotation to the cap removal tool.

It should be noted that although the tool such as 10 in FIG. 1 is described as a composite of separate pieces, it is within the breadth of the present invention for the tool to be machined or molded as a single unit. Further the means whereby the gripper ring engages the cap can include an elastomeric O-ring positioned in a suitably located annular groove on the interior surface of the gripper ring area of the tool. Still further, the cap engaging means can comprise a ball nose spring plunger, available as part # 3408A65, from McMaster Carr Company of Dayton New Jersey, disposed again at an appropriate location on the interior surface of the gripper ring area.

Thus it can be seen that the cap removal system of the present invention offers important new conveniences in animal feeding water bottle management. For the smaller scale research facility an economical solution to a tedious problem is provided, while at the same time substantially increasing worker efficiency in an ergonomically acceptable manner.

While the present invention has been disclosed in connection with versions shown in detail, various modifications and improvements will become readily apparent to those skilled in the art. Accordingly, the spirit and scope of the present invention is to be limited only by the following claims.

What is claimed is:

1. A power tool for handling a bottle cap, utilized for an animal water feeding bottle, comprising:
  (a) a straight tube having an interior area;
  (b) a gripper head being affixed at a first end of said straight tube, said gripper head comprising a confluent, substantially hollow upper and lower section, said upper section having an aperture at a center area of said upper section, said aperture being connected to said first end of said straight tube, said aperture being confluent with said straight tube's interior area, said upper section extending radially outward from said center area aperture, said lower section being a gripper ring perpendicularly attached to an outer edge of said radially outwardly extending upper section at an outer edge of said gripper ring;
  (c) said gripper ring having an interior surface, said interior surface adapted to engage an exterior surface of said bottle cap to be handled by said gripper ring;
  (d) a first annular groove at said point of attachment of said gripper ring to said outer edge;
  (e) an O ring, said O ring having a slightly smaller diameter than a diameter of said bottle cap, so that when said O ring is placed within said first annular groove said O ring acts as a spacer between said gripper head upper section and said gripper ring to minimize a tendency of said gripper ring to grasp said bottle cap by said gripper head during bottle cap removal procedures;
  (f) a source of power; and
  (g) means for connecting a second end of said straight tube to said source of power, said source of power having means for rotating said straight tube in a first direction or in a second direction in accordance with the intentions of an operator, so that when said straight tube is connected to said power source connecting means, and when said power source connecting means is connected to said source of power, and when said gripper ring is secured over said matching bottle cap by said operator, activating said power source in a first direction by said operator secures said bottle cap to said bottle when said bottle cap is positioned on top of screw threads on said bottle, and activating said power source in a second direction by said operator removes said bottle cap from said bottle when said bottle cap is secured to said screw threads on said bottle.

2. The power tool according to claim 1 wherein said upper section of said gripper head is in the shape of a cone with said aperture positioned at the apex of said cone, and with an outer edge of the base of said cone being affixed to said gripper ring.

3. The power tool according to claim 1, further comprising a confluent slot in at least one of said straight tube and said gripper head, said slot extending through a peripheral edge of said gripper ring and said upper portion of said gripper head and continuing a spaced distance along a length of said straight tube, said spaced distance being of sufficient extent so as to accommodate angled water dispensing tubes of maximum anticipated lengths.

4. The power tool according to claim 1 wherein said means for connecting said second end of said straight tube to said source of power is a hex bar affixed to said second end of said straight tube.

5. The power tool according to claim 1 wherein said interior surface of said gripper ring has a first area adjacent to a point of attachment of said gripper ring to said upper section, and a second area adjacent to an open end of said gripper ring, said interior surface being tapered from said first area to said second area so as to create a slightly larger opening of said gripper ring at said second area in relation to said first area.

6. The power tool according to claim 1, further comprising a gripper ring having two or more interior surfaces adapted to match respective exterior surfaces of two or more different sets of said bottle cap matching exterior surfaces, each one of said gripper ring interior surfaces matching a different diameter set of said bottle cap exterior surfaces, said two or more sets of said gripper ring interior surfaces being positioned one above another, from smaller to larger diameter sets of said gripper ring interior surfaces, with the smallest diameter set of said gripper ring interior surfaces being positioned adjacent a point of attachment of said gripper ring to said upper section.

7. The power tool according to claim 1, further comprising an O ring having a slightly smaller inside diameter then an outside diameter of said bottle cap, so that when said O ring is placed within said first annular groove at said point of attachment of said gripper ring to said upper section, and when said gripper ring is secured to said bottle cap, said O ring is deformed between said annular groove and a peripheral edge of said bottle cap, thereby temporarily causing said bottle cap to be grasped by said gripper head.

8. The power tool according to claim 1, further comprising a second O ring, said second O ring having an inside diameter sufficient to fit over said external side of said bottle cap, said gripper ring having a second annular groove a spaced distance below a point of attachment of said gripper ring to said upper section, so that when said second O ring is placed within said second annular groove, and when said gripper ring is secured to said bottle cap, said bottle cap contacts said O ring and is thereby temporarily grasped by said gripper head.

9. The power tool according to claim 1, further comprising said power source having means for controlling torque over a range directed by said operator.

10. The power tool according to claim 1 wherein said source of power is an electric screw driver.

11. The power tool according to claim 1, further comprising means for universal positioning of said straight tube and said gripper head up and down, from front to back, and from left to right over a workplace containing one or more of said bottle caps and said bottles.

12. The power tool according to claim 11 wherein said source of power is an electric screw driver.

13. The power tool according to claim 11 wherein said source of power is a motorized, flexible shaft.

14. A power tool for handling a screw cap bottle cap, utilized for an animal water feeding screw cap bottle, comprising:

(a) a straight tube;

(b) a gripper head being affixed at a first end of said straight tube, said gripper head comprising a confluent, substantially hollow upper and lower section, said upper section having an aperture at a center area of said upper section, said center area of said upper section being connected to said first end of said straight tube, said aperture being confluent with an interior area of said straight tube, said upper section extending radially outward from said center area, said lower section being a gripper ring perpendicularly attached at an outer edge of said radially outwardly extending upper section at an outer edge of said gripper ring;

(c) said gripper ring having at least one set of serrations along an interior surface positioned parallel to said straight tube, said at least one set of said gripper ring serrations substantially matching bottle cap serrations on an exterior surface of a least one bottle cap to be handled by said gripper ring;

(d) a first annular groove at said point of attachment of said gripper ring to said outer edge;

(e) an O ring, said O ring having a slightly smaller diameter than a diameter of said bottle cap, so that when said O ring is placed within said first annular groove said O ring acts as a spacer between said gripper head upper section and said gripper ring to minimize a tendency of said gripper ring to grasp said bottle cap by said gripper head during bottle cap removal procedures;

(f) an electric screw driver; and (g) said second end of said straight tube having a typically hexagonally shaped drive tool mating piece for connection to said electric screw driver, said electric screw driver being selected from the group consisting of battery powered or electric line cord powered, said electric screw driver having means for controlling torque over a range directed by an operator, said electric screw driver having means for rotation in a first direction or a second direction in accordance with directions from said operator, so that when said drive tool mating piece is connected to said electric drill, and when said gripper ring serrations are secured over said matching bottle cap serrations by said operator, activating said power source in a first direction by said operator secures said bottle cap to said bottle when said bottle cap is positioned on top of screw threads on said bottle, and activating said power source in a second direction by said operator removes said bottle cap from said bottle when said bottle cap is secured to said screw threads on said bottle.

* * * * *